Aug. 22, 1950     B. R. KRAMER     2,519,770

HIGH-PRESSURE VESSEL

Filed April 29, 1949

INVENTOR.
B. R. KRAMER
BY Hudson & Young
ATTORNEY

Patented Aug. 22, 1950

2,519,770

UNITED STATES PATENT OFFICE 2,519,770

HIGH-PRESSURE VESSEL

Burt R. Kramer, Bartlesville, Okla., assignor to Phillips Petroleum Company, a corporation of Delaware Application April 29, 1949, Serial No. 90,413

9 Claims. (Cl. 23—290)

This invention relates to pressure vessels. In one specific aspect it relates to means for securing closure members to pressure vessels to keep openings in the vessels sealed against high internal pressure. In another specific aspect it relates to means to heat the vessel, pass materials through the vessel, and hold closure plates in position in the vessel by means of a frame surrounding the vessel and hydraulic jacks mounted on the frame and engaging the closure plates, the pressure fluid actuating the hydraulic jacks coming from the interior of the vessel.

A number of chemical reactions requiring high pressure and often also high temperature are now being used commercially. For example, in hydrogenation of coal and in ammonia synthesis temperatures around 1000° F. and pressures of 5000 p. s. i. are coming into use commercially while pressures as high as 20,000 to 50,000 p. s. i. are being given tests on a small scale. These pressure vessels are often as long as 20 to 50 feet and at 1000° F. the expansion of such vessels is often from 3 to 5 inches in length. At present the diameter of such vessels is limited to from 6 to 30 inches outside diameter depending on the temperature and pressure, the limiting factor being the size of the closure plate. Closure plates of larger diameter than the diameters mentioned in the last sentence are impractical at present because they cannot be kept closed. At present bolts up to three and four inches in diameter with 6-inch nuts are employed which seriously limits the number of bolts, and even then it is found that the total bolt strength is not sufficient for any larger heads. Extraordinary handling equipment is required for tightening and loosening of such nuts, and it is also necessary to provide huge cranes to transport the vessels from the location with the process equipment to a location where the equipment is available for the removal of nuts and closure heads.

The present invention allows larger closure members to be used on such pressure vessels because the closure member is not retained entirely by bolts, as the closure member is forced against the seat by hydraulic jacks with a force which may be less then, equal to, or greater than the internal force tending to unseat the closure member by any desired amount. This allows the pressure vessel to be of greater diameter than possible heretofore, which is important in commercial operations for the following reasons: A larger diameter vessel will allow more material to be treated in a given time.

A large diameter vessel will conserve heat as less heat will be lost by radiation.

Many of these pressure vessels have complicated heat exchange or catalyst retaining baffles, which must be inserted through the closure means, and a larger diameter vessel provides more treating surface.

One object of the present invention is to permit the use of pressure vessels of a diameter greater than two feet in high pressure and high temperature service.

Another object is to provide a suitable pressure vessel.

A further object is to provide a pressure vessel having at least one end closure at least partly retained in place on the vessel by a frame surrounding the vessel and fluid jack means between said frame and said closure for retaining the closure in place.

Numerous other objects and advantages will be apparent to those skilled in the art upon reading the accompanying specification, claims and drawings.

In the drawings—

Figure 1:
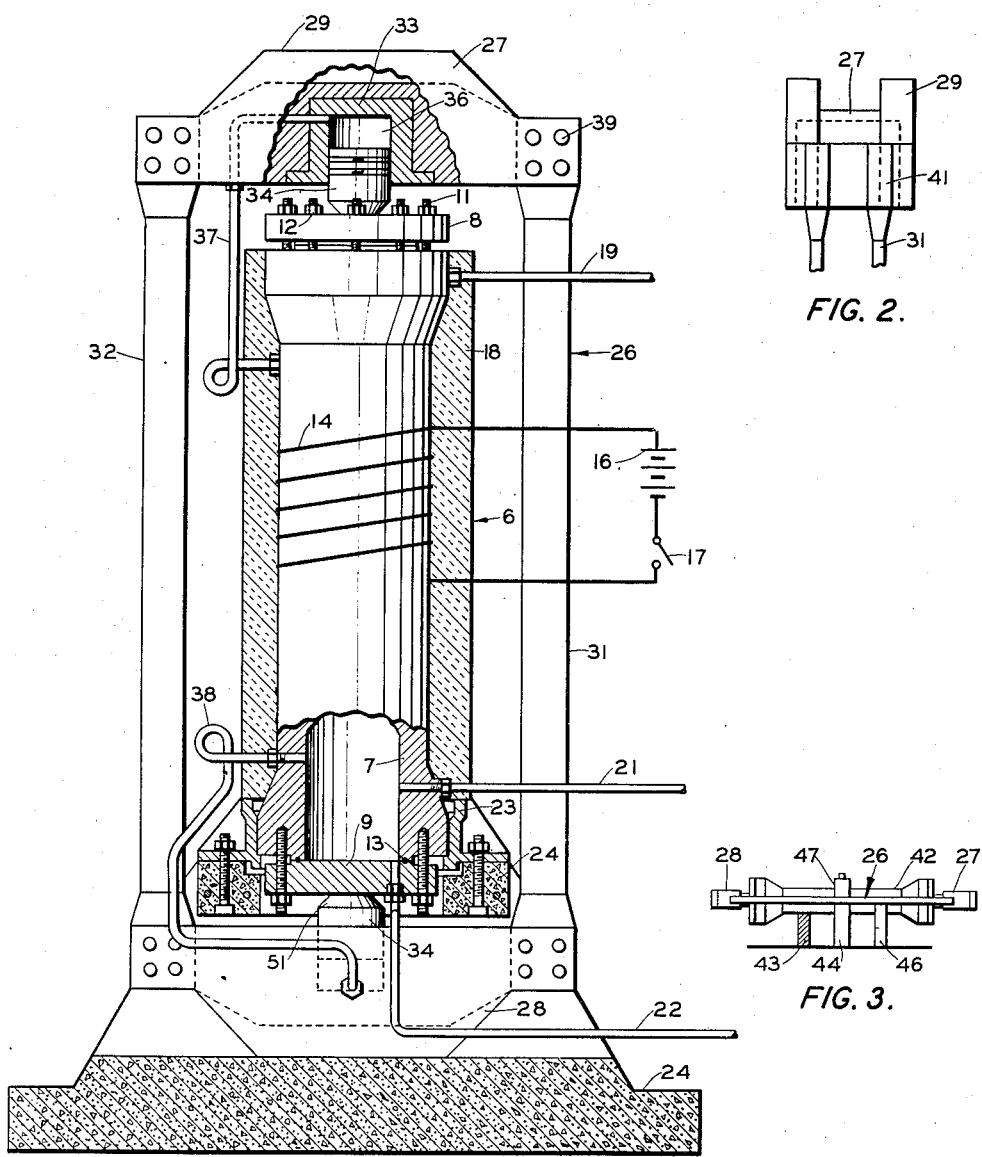
Figure 1 is an elevational view with parts broken away and in cross section showing a pressure vessel embodying the present invention.

In Figure 1 the pressure vessel generally designated as 6 comprises a hollow cylindrical body 7. The open ends of body 7 are closed by closure plates 8 and 9. Closure plates 8 and 9 are preferably held against body 7 by stud bolts 11 and nuts 12. If desired a gasket 13 of ductile metal or other suitable material may be provided between the end of body 7 and the end plate 8 or 9.

A heater may be provided to heat the body 7, a suitable heater being a helical coil of electrical resistance heating wire 14 which may be connected to any suitable alternating or direct current source such as battery 16 controlled by switch 17. Obviously switch 17 may be operated by means (not shown) controlled by a thermostat (not shown) suitably disposed relative to body 7 to maintain the same at a constant desired temperature. As such vessel heating means is well known it is not illustrated. A steam pipe (not shown) could replace wire 14 and fluid heat exchange be used instead of electrical heating, employing the usual controls.

In order to conserve heat energy a layer of heat insulation 18 may be provided around any desired portion of body 7.

While the body 7 is shown with two closure plates 8 and 9, it could of course only have one closure plate, the other closure plate being made integral with the body. Similarly body 7 could be employed for batch operations in which at least one of the closure plates 8 or 9 would have to be removed in order to replace the material being treated, but it is much more useful to carry out a continuous process as shown in Figure 1 by means of suitable inlet and outlet conduits 19, 21 and 22. The number of conduits 19, 21 and 22 that are used depends entirely upon the desired process and the invention is not limited to the number shown. The three conduits shown are shown merely to illustrate how these conduits can come in through the end closure as conduit 22 does, or in through various points on body 7 as shown by conduits 19 and 21.

In many processes carried out in such pressure vessels 6, such as hydrogenation, very complicated labyrinths of baffles, catalysts and catalysts supports and the like (not shown) are often inserted inside of body 7 and such devices often fill substantially all the space inside of body 7. However, as these devices vary from vessel to vessel depending entirely on the type of reaction desired and on the diameter, it has not been regarded as necessary to show the same as the present invention is not limited thereto but will operate no matter what is placed inside body 7, or whether body 7 is empty of any mechanical structure, as shown. When such internal structures (not shown) are present inside body 7 the present invention becomes even more important than when they are absent because a full size opening must be provided to insert such internal structure.

Figure 3:
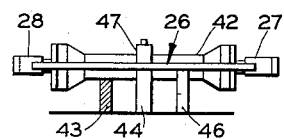
Figure 3 is an elevational view with parts in cross section of a second embodiment of the present invention.
Figure 4:
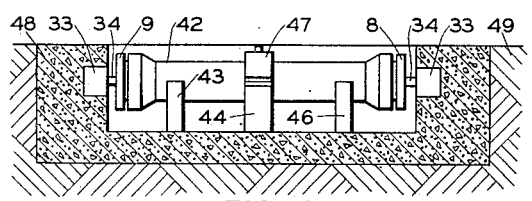
Figure 4 is an elevational view with parts in cross section of a third embodiment of the present invention.

Body 7 may be supported in a number of different positions and by different means as shown in Figures 1, 3 and 4. Each way has its advantages.

In Figure 1, body 7 is supported in upright position in socket member 23 which in turn is supported in reinforced concrete foundation 24. Foundation 24 may be secured to the floor of a building but preferably is secured to the surface of the earth because these large pressure vessels 6 are quite heavy.

Surrounding vessel 6 is a frame generally designated as 26. Frame 26 comprises head members 27 and 28, preferably designed to resist bending by such means as reinforcing ribs 29. Heads 27 and 28 are connected together by tension resisting members 31 and 32.

Heads 27 and 28 are provided with cylinders 33 having pistons 34 fitted slidably therein. The fluid pressure space 36 behind piston 34 is connected by the respective conduit 37 or 38 to the interior chamber of body 7 so as to transmit fluid pressure therebetween.

In Figure 1, frame 26 is resting on foundation 24 and its weight is not being applied to body 7, so it is desirable to have upper and lower pistons 34. When there is no objection to carrying the weight of frame 26 on body 7, as is often the case, one of the two pistons 34 can be eliminated and either head 27 or 28 shaped to contact the respective closure plate 8 or 9 direct because as all forces generate equal and opposite forces, one piston 34 will force the support end of the frame against the support closure plate. Whether one or two pistons 34 are employed at the same time, it is possible to use 1 or 2 closure plates 8 and 9 as either 8 or 9 may be made integral with body 7, and it is immaterial whether the remaining piston 34 engages the remaining closure plate or the opposite end of the vessel where the closure plate has been made integral, or where there is no closure plate but merely the integral bottom or top of the vessel.

Figure 2:
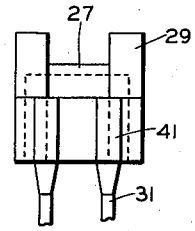
Figure 2 is a side view of the top portion of Figure 1.

The parts of frame 26 may be secured together with rivets 39. If desired to disassemble, the frame rivets 39 may be replaced by the usual nuts and bolts. As shown in Figure 2, the tension members 31 may be fitted into head 27 by dove tail construction at 41 or by any other suitable construction. Especially, with long pressure vessels of 20 to 50 feet or more in length, it is desirable to place the pressure vessel in a horizontal position as shown in Figure 3. The pressure vessel 42 is supported on its side by support members 43, 44 and 46. Vessel 42 is preferably clamped in place on the central support member 44 by a clamp member 47 and thermal expansion and contraction of vessel 42 then occurs in both directions with the central portion at 44 remaining stationary. The vessel 42 slides on supports 43 and 46. If desired anti-friction rollers of any type may be provided on supports 43 and 46 for vessel 42 to roll on, but such rollers are not shown because they are generally unnecessary. Frame 26 with heads 27 and 28 as shown in Figure 1 are then placed around vessel 42 surrounding the same. Frame 26 may be supported by separate support means (not shown), or may be supported from vessel 42 (not shown) or may be supported on supports 46 as shown. Frame 26 may be free to move in which case only one piston 34 is necessary, but preferably frame 26 is clamped stationary at its center against support 44 by clamp 47 in which case a piston 34 is necessary at each end.

In Figure 4, vessel 42 is shown supported by the same supports 43, 44 and 46 as in Figure 3, but they are mounted in a concrete basement 48 preferably sunk in the surface of the earth 49 because concrete is not strong in tension. With the earth to back up concrete 48 and with cylinders 33 and 34 provided therein, the same method of pressing end closures 8 and 9 against vessel 42 may be employed as in the other figures. If desired basement 48 can be reinforced with reinforcing rods (not shown) in which case it would not need to be sunk in the earth 49, or 48 could be so massive as to not need reinforcing.

The ends of pistons 34 are shown beveled at 51 in Figure 1 but such beveling can be eliminated to provide suitable enlarged contact with head 9 if desired. While piston 34 is shown of a smaller diameter than the internal diameter of cylinder 7, it may be made of equal or larger diameter as long as nuts 12 do not interfere. Pipe 22 can be removed or run in at another point similar to pipe 21.

If the hydraulic area of the piston is equal to the internal area of the vessel there will be no tension exerted on studs 11. When the hydraulic area is smaller the piston does not take all of the load off of studs 11 but takes off enough of the load to enable small studs to be used.

While no heat insulation, such as 18 of Figure 1, is shown in Figures 3 and 4, obviously it may be applied in the usual manner in which large pipes are insulated, having due regard to leaving space around supports 43 and 46 to allow for the thermal expansion of vessel 42. However no space for expansion is needed at central member 44, for vessel 42 is stationary relative to 44. No insulation was shown in drawing Figures 3 and 4, but it should be understood that heat insulation 18 and heating means 14, 16 and 17 are just as useful and are as much a part of Figures 3 and 4 as they are a part of Figure 1.

*Operation*

If it is desired to heat vessel 6, switch 17 may be closed and power from battery 16 heats coil 14. Materials under high pressure are introduced or removed through lines 19, 21 and 22 as desired. These materials may be liquids or gases, the generic term being fluids. The fluid pressure inside vessel 7 (whether liquid or gas) is transmitted through conduits 37 and 38 to press piston 34 against end closures 8 and 9. The amount of force so supplied tends to cancel out at least a portion of the internal force in vessel 7 thereby reducing the load on stud bolts 11 or nuts 12. If piston 34 is the same diameter as the interior of body 7 no force is placed on studs 11 except that being desirable to maintain a seal, which seal may be aided by a suitable gasket 13.

The operation is the same in all the figures of the drawing.

While I have shown three specific embodiments of the present invention they have been shown for purposes of illustration and are not a limitation of the invention, the scope of which is commensurate with the appended claims.

Having described my invention, I claim:

1. A pressure vessel comprising in combination a body having a chamber therein, a heater to heat said body, said body having an external opening communicating with said chamber, a closure member secured to said body and disposed to close said opening, a frame surrounding said body, said frame having means engaging said member and means engaging a portion of said body opposite said member, at least one of said means comprising a fluid jack disposed to urge said frame away from said body, and a conduit connecting said chamber with said fluid jack.

2. A pressure vessel comprising in combination a body having a chamber therein, said body having an external opening communicating with said chamber, a closure member secured to said body and disposed to close said opening, a frame surrounding said body, said frame having means engaging said member and means engaging a portion of said body opposite said member, at least one of said means comprising a fluid jack disposed to urge said frame away from said body, and a conduit connecting said chamber with said fluid jack.

3. A pressure vessel comprising in combination a body having a chamber therein, said body having an external opening communicating with said chamber, a closure member disposed to close said opening, a frame surrounding said body, said frame having means engaging said member and means engaging a portion of said body opposite said member, at least one of said means comprising a fluid jack disposed to urge said frame away from said body, and a conduit connecting said chamber with said fluid jack.

4. A pressure vessel comprising in combination a body having a chamber therein, a heater to heat said body, said body having an external opening communicating with said chamber, a closure member disposed to close said opening, a frame surrounding said body and secured to said body at a point intermediate the ends of said body and said frame, a cylinder, and a piston reciprocating in fluid tight engagement in said cylinder, disposed between each end of said body and said frame, and a conduit connecting said chamber with each of said cylinders.

5. A pressure vessel comprising in combination a body having a chamber therein, said body having an external opening communicating with said chamber, a closure member disposed to close said opening, a frame surrounding said body and secured to said body at a point intermediate the ends of said body and said frame, a cylinder, and a piston reciprocating in fluid tight engagement in said cylinder, disposed between each end of said body and said frame, and a conduit connecting said chamber with each of said cylinders.

6. A pressure vessel comprising in combination a body having a chamber therein, said body having an external opening communicating with said chamber, a closure member disposed to close said opening, a frame surrounding said body and secured to said body, a cylinder, and a piston reciprocating in fluid tight engagement in said cylinder, disposed between each end of said body and said frame, and a conduit connecting said chamber with each of said cylinders.

7. A reaction vessel for high pressure and high temperature hydrogenation comprising in combination a hollow cylindrical body, a closure head bolted to each end of said body to close the same, means for heating said body, inlet and outlet conduits connected to the interior of said body for the passage of materials being used in said hydrogenation, a frame surrounding said body, a cylinder mounted on said frame opposite each closure head, a piston slidably mounted in each cylinder in engagement with the adjacent closure head, and conduits connecting said cylinders with the interior of said body whereby fluid pressure in said body against said closure heads is at least partly balanced by fluid pressure in said cylinders urging said pistons against said closure heads.

8. A reaction vessel for high pressure hydrogenation comprising in combination a hollow cylindrical body, a closure head bolted to each end of said body to close the same, inlet and outlet conduits connected to the interior of said body for the passage of materials being used in said hydrogenation, a frame surrounding said body, a cylinder mounted on said frame opposite each closure head, a piston slidably mounted in each cylinder in engagement with the adjacent closure head, and conduits connecting said cylinders with the interior of said body whereby fluid pressure in said body against said closure heads is at least partly balanced by fluid pressure in said cylinders urging said pistons against said closure heads.

9. A reaction vessel for high pressure hydrogenation comprising in combination a hollow cylindrical body, a closure head bolted to each end of said body to close the same, a frame surrounding said body, a cylinder mounted on said frame opposite each closure head, a piston slidably mounted in each cylinder in engagement with the adjacent closure head, and conduits connecting said cylinders with the interior of said body whereby fluid pressure in said body against said closure heads is at least partly balanced by fluid pressure in said cylinders urging said pistons against said closure heads.

BURT R. KRAMER.

No references cited.